(12) United States Patent
Leffler et al.

(10) Patent No.: US 11,713,928 B2
(45) Date of Patent: Aug. 1, 2023

(54) MICROCHANNEL HEAT EXCHANGER HAVING AUXILIARY HEADERS AND CORE

(71) Applicant: Carrier Corporation, Palm Beach Garden, FL (US)

(72) Inventors: Robert A. Leffler, Boston, MA (US); Arindom Joardar, Jamesville, NY (US); Jon P. Kennedy, Syracuse, NY (US); Kevin Mercer, Danville, IN (US); Thomas Bryant, Brewerton, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 170 days.

(21) Appl. No.: 16/949,371

(22) Filed: Oct. 27, 2020

(65) Prior Publication Data

US 2021/0140713 A1 May 13, 2021

Related U.S. Application Data

(60) Provisional application No. 62/931,824, filed on Nov. 7, 2019.

(51) Int. Cl.
*F28D 1/00* (2006.01)
*F28D 1/053* (2006.01)
*F28F 1/12* (2006.01)
*B23K 1/00* (2006.01)

(52) U.S. Cl.
CPC .......... *F28D 1/05383* (2013.01); *F28F 1/126* (2013.01); *B23K 1/0012* (2013.01); *F28F 2260/02* (2013.01)

(58) Field of Classification Search
CPC .... F28D 1/053; F28D 1/0426; F28D 1/05383; F28D 1/0476; F28F 1/12; F28F 1/126; F28F 2260/02
See application file for complete search history.

(56) References Cited

U.S. PATENT DOCUMENTS

| | | | |
|---|---|---|---|
| 8,561,427 B2 | 10/2013 | Knight et al. | |
| 9,752,833 B2 | 9/2017 | Gao et al. | |
| 10,254,054 B2 | 4/2019 | Jin et al. | |
| 2005/0081534 A1* | 4/2005 | Suzuki | H01L 23/473 257/E23.098 |
| 2010/0242535 A1* | 9/2010 | Jianlong | F25B 39/028 62/524 |
| 2011/0232884 A1 | 9/2011 | Jiang et al. | |
| 2014/0202660 A1* | 7/2014 | Seligman | F01P 3/18 165/96 |

(Continued)

FOREIGN PATENT DOCUMENTS

CN 106482398 3/2017

*Primary Examiner* — Harry E Arant
(74) *Attorney, Agent, or Firm* — Cantor Colburn LLP (57) ABSTRACT

Disclosed is a microchannel heat exchanger comprising a primary core including a first header and a second header and a secondary core including a first auxiliary header and a second auxiliary header, further comprising a first header interconnect extending between the first header and the first auxiliary header and having a first interconnect fluid passage extending therethrough; and a second header interconnect extending between the second auxiliary header and the second header and having a second interconnect fluid passage extending therethrough.

13 Claims, 9 Drawing Sheets

(56) References Cited

U.S. PATENT DOCUMENTS

2015/0328979 A1* 11/2015 Matsuo ................ B60K 11/04
  180/68.1
2017/0130974 A1  5/2017 Mercer et al.
2018/0054924 A1* 2/2018 Zill .................... H05K 7/20772
2018/0058763 A1  3/2018 Wei

* cited by examiner

MICROCHANNEL HEAT EXCHANGER HAVING AUXILIARY HEADERS AND CORE

CROSS REFERENCE TO A RELATED APPLICATION

The application claims the benefit of U.S. Provisional Application No. 62/931,824 filed Nov. 7, 2019, the contents of which are hereby incorporated in their entirety.

BACKGROUND

Exemplary embodiments pertain to the art of heat exchanger design. More particularly, the present disclosure relates to configurations of microchannel heat exchangers in heating and/or cooling systems.

As system compactness of heating and/or cooling systems is increased the system designer is faced with a reduced volume allocation in which to place system components. Accordingly, system designers are driven to fill the open space within a given product volume to a point that optimizes performance. Designers are also incented to replace existing components with more capable versions, allowing larger product size reductions or performance improvements.

Microchannel heat exchangers can offer improved heat transfer effectiveness relative to round tube and fin heat exchangers. Therefore as microchannel heat exchangers find wider acceptance in building heating and cooling systems it can be expected that system designers will increasingly be faced with packaging challenges.

BRIEF DESCRIPTION

Disclosed is a microchannel heat exchanger comprising: a primary core comprising: a first header having a first collection volume therein; a second header having a second collection volume therein; a first plurality of microchannel tubes having a first plurality of fluid passages extending therethrough and having a primary tube length L1, wherein the first plurality of microchannel tubes extend between the first header and the second header such that the first plurality of fluid passages are in fluid communication with the first collection volume and the second collection volume; a first plurality of fins disposed between adjacent tubes of the first plurality of microchannel tubes; a secondary core comprising: a first auxiliary header having a first auxiliary collection volume therein; a second auxiliary header having a second auxiliary collection volume therein; a second plurality of microchannel tubes having a second plurality of fluid passages extending therethrough and an auxiliary tube length L2, wherein the second plurality of microchannel tubes extend between the first auxiliary header and the second auxiliary header such that the second plurality of fluid passages are in fluid communication with the first auxiliary collection volume and second auxiliary collection volume; a second plurality of fins disposed between adjacent tubes of the second plurality of microchannel tubes; a first header interconnect extending between the first header and the first auxiliary header and having a first interconnect fluid passage extending therethrough; wherein the first interconnect fluid passage is in fluid communication with the first collection volume and the first auxiliary collection volume; and a second header interconnect extending between the second auxiliary header and the second header and having a second interconnect fluid passage extending therethrough; wherein the second interconnect fluid passage is in fluid communication with the second collection volume and the second auxiliary collection volume.

In addition to one or more of the above disclosed aspects or as an alternate further comprising a third plurality of fins and wherein the first plurality of microchannel tubes is disposed adjacent to the second plurality of microchannel tubes, and wherein the third plurality of fins is disposed between adjacent tubes of the first plurality of microchannel tubes and the second plurality of microchannel tubes.

In addition to one or more of the above disclosed aspects or as an alternate wherein the first auxiliary header extends substantially parallel to the first header and the second auxiliary header extends substantially parallel to the second header and the first and second auxiliary headers are disposed adjacent the first plurality of microchannel tubes.

In addition to one or more of the above disclosed aspects or as an alternate further comprising a fluid distributor disposed in the first collection volume of the first manifold, wherein the fluid distributor comprises a plurality of outlet ports.

In addition to one or more of the above disclosed aspects or as an alternate wherein the secondary tube length L2 is less than the primary tube length L1.

In addition to one or more of the above disclosed aspects or as an alternate wherein the first plurality of microchannel tubes comprises more tubes than the second plurality of microchannel tubes.

In addition to one or more of the above disclosed aspects or as an alternate wherein at least one of the first header interconnect and the second header interconnect consist of a single fluid passage therethrough.

In addition to one or more of the above disclosed aspects or as an alternate wherein at least one of the first header interconnect and the second header interconnect consist of a plurality of fluid passages therethrough.

In addition to one or more of the above disclosed aspects or as an alternate wherein at least one of the first header interconnect fluid passage and the second header interconnect fluid passage comprise a cross sectional flow area F that is equal to from about 80% to about 120% of a total cross sectional flow area of the plurality of second microchannel tubes.

In addition to one or more of the above disclosed aspects or as an alternate wherein at least one of the first header interconnect fluid passage and the second header interconnect fluid passage comprise a cross sectional flow area F that is equal to from about 90% to about 110% of a total cross sectional flow area of the plurality of second microchannel tubes.

In addition to one or more of the above disclosed aspects or as an alternate wherein at least one of the first header interconnect fluid passage and the second header interconnect fluid passage comprise a cross sectional flow area F that is equal to the total cross sectional flow area of the plurality of second microchannel tubes.

In addition to one or more of the above disclosed aspects or as an alternate wherein the secondary core is spaced a distance Dt from the primary core and wherein the distance Dt is measured along a flow direction of a second heat transfer fluid.

In addition to one or more of the above disclosed aspects or as an alternate further comprising a flow baffle disposed adjacent at least one of the primary core or the secondary core.

In addition to one or more of the above disclosed aspects or as an alternate wherein the microchannel heat exchanger is assembled using a brazing process.

In addition or as an alternate a furnace comprising a microchannel heat exchanger as in any of the above disclosed aspects.

In addition or as an alternate a fan coil unit comprising a microchannel heat exchanger as in any of the above disclosed aspects.

Further disclosed is a method of manufacturing a microchannel heat exchanger comprising: forming a primary core comprising a first header, a second header, and a first plurality of microchannel tubes extending therebetween, and having a first plurality of fins disposed between adjacent tubes, forming a secondary core comprising a first auxiliary header, a second auxiliary header, and a second plurality of microchannel tubes extending therebetween, and having a second plurality of fins disposed between adjacent tubes, plumbing a first interconnect between the first header and the first auxiliary header, plumbing a second interconnect between the second header and the second auxiliary header, and brazing the microchannel heat exchanger to fixedly attach the primary core to the secondary core along at least the first interconnect and the second interconnect.

In addition to one or more of the above disclosed aspects or as an alternate the method further comprising positioning a third plurality of fins between the first plurality of microchannel tubes and the second plurality of microchannel tubes, and wherein the brazing comprises brazing the microchannel heat exchanger to fixedly attach the primary core to the secondary core additionally along at least the third plurality of fins.

In addition to one or more of the above disclosed aspects or as an alternate the method further comprising bending the microchannel heat exchanger along a finless section of the first plurality of microchannel tubes and the second plurality of microchannel tubes into a bent configuration.

In addition to one or more of the above disclosed aspects or as an alternate the method wherein the bending further comprises forming the microchannel heat exchanger into an A-shape, M-shape, U-shape, V-shape, W-shape, N-shape, or an n-shape.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

It can be desirable to increase the heat transfer surface area of microchannel heat exchangers in order to increase total system heat transfer and improve system efficiency. However, packaging constraints associated with heat transfer systems such as at least furnaces, heat pumps, and air conditioning systems (e.g., fan coils, evaporator units, condenser units, and the like) can limit the orientation, shape and size of the heat exchangers used therein. Other components of these systems, such as compressors, fans, blowers, valves, burners, controllers, sensors, plumbing and the like, can further limit the packaging volume allocated to the heat exchanger. In particular, the inlet and/or outlet plumbing associated with conveying fluid to and from the heat exchanger can limit the volume allocation for the heat exchanger core (e.g., microchannel tubes and adjacent fins). For example, products can have a box-shape volume allocation for the heat exchanger where a portion of the box includes the inlet and outlet plumbing. In some cases this can reduce the width of the heat exchanger core, the axial length of a header, or both, to less than the corresponding width of the box-shape volume thereby reducing the overall heat transfer capability of such systems.

Figure 1:
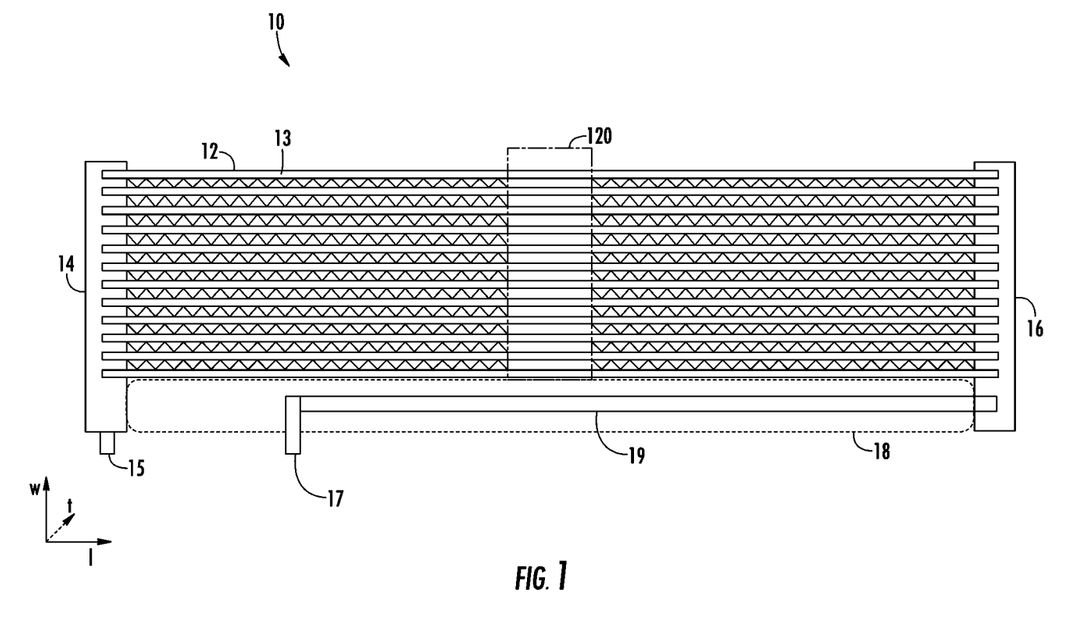
FIG. 1 is a schematic top view of a microchannel heat exchanger in a flat configuration.

FIG. 1 shows a schematic view of a microchannel heat exchanger 10 laid flat during the manufacturing process. The microchannel heat exchanger 10 includes a plurality of microchannel tubes 12 extended between an inlet header 14 and an outlet header 16. The plurality of microchannel tubes can be in thermal communication with optional heat transfer fins 13, which can be disposed between adjacent tubes of the plurality of microchannel tubes 12. The microchannel heat exchanger 10 can include an inlet port 15 and an outlet port 17 for fluidly connecting it to the remainder of the heat transfer system (e.g., furnace, heat pump, refrigeration system, air conditioner and the like). The inlet port 15 and outlet port 17 allow for a first heat transfer fluid (e.g., water, water conditioners, water additives, refrigerants such as hydrofluorocarbon (HFC) refrigerants or hydrofluoroolefin (HFO) refrigerants, including flammable refrigerants such as R-1234yf and the like) to be supplied to, and returned from, the microchannel heat exchanger 10 and can be connected to the corresponding header in any suitable orientation. For example, a fluid conduit 19 extending along the longest dimension of the header (e.g., along w dimension in the attached figures) can connect a port to an end of the corresponding header. In another example, a fluid conduit 19 can connect a port to a side of the corresponding header, e.g., where the fluid conduit 19 extends in a plane parallel to the plurality of microchannel tubes 12.

The microchannel heat exchanger 10 can include one or more fluid conduits 19 for fluidly connecting the inlet port 15, the outlet port 17, or both to the corresponding header(s). A fluid conduit 19 can provide a means to return the first heat transfer fluid to the remainder of the fluidic system from the heat exchanger. As such, the fluid conduit 19 can allow the inlet port 15 and the outlet port 17 to be closely located. However, by traversing across to the heat exchanger, from one header toward the other, a fluid conduit 19 can interfere with the heat exchanger core and create an unoccupied region 18 (e.g., unoccupied volume). Such an unoccupied region 18 can be adjacent to the heat exchanger core and can reduce the overall heat transfer surface area of the heat exchanger by occupying space that could otherwise be filled with a larger heat exchanger core (e.g., microchannel tubes 12 and fins 13).

The microchannel heat exchanger 10 can include one or more optional finless sections 120, where there are no fins disposed between adjacent microchannel tubes 12. The absence of fins in a finless section 120 can allow the microchannel heat exchanger 10 to be bent into the desired final shape during manufacturing. For example, the microchannel heat exchanger 10 can be bent into a bent configuration, for example having an A-shape, M-shape, U-shape, V-shape, W-shape, N-shape or the like. Such forming processes can increase the heat transfer surface area per unit volume of the microchannel heat exchanger by increasing the size of the heat exchanger core within a given volume.

Figure 2:
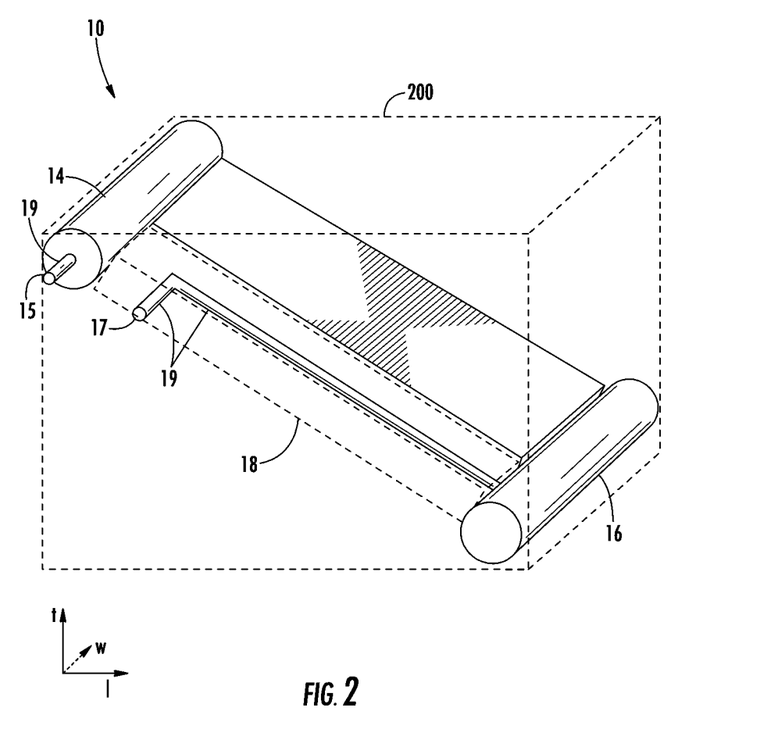
FIG. 2 is a schematic side view of a diagonal flat microchannel heat exchanger.

Turning to FIG. 2, which shows a schematic view of the microchannel heat exchanger 10 extended diagonally within a box-like volume 200. The inlet port 15, the outlet port 17, or both can include additional fluid conduit 19 which can aid in co-locating the inlet port 15 and outlet port 17 (e.g., on the same side and/or within a distance equal to up to about 15 times the outside diameter of the outlet port 17 of one another). By co-locating the outlet port 17 near the inlet port 15 the first heat transfer fluid is returned near to where it was supplied to the microchannel heat exchanger 10. This can allow the system designer to better accommodate the remaining components of the system (e.g., electronics, burner, compressor, blower, fan, expansion valve, and the like). Co-locating the interface ports in this way can also allow for modular design of the remaining systems. Consequently however, the microchannel heat exchanger 10 can be left with an unoccupied region 18 (shown in dotted lines) that is not occupied by heat exchanger core, e.g., microchannel tubes 12 and fins 13. This unoccupied region 18, although utilized for plumbing from inlet port 15 to the inlet header 14 and/or from the outlet port 17 to the outlet header 16, can reduce the total available heat transfer surface area of the microchannel heat exchanger 10.

Figure 3:
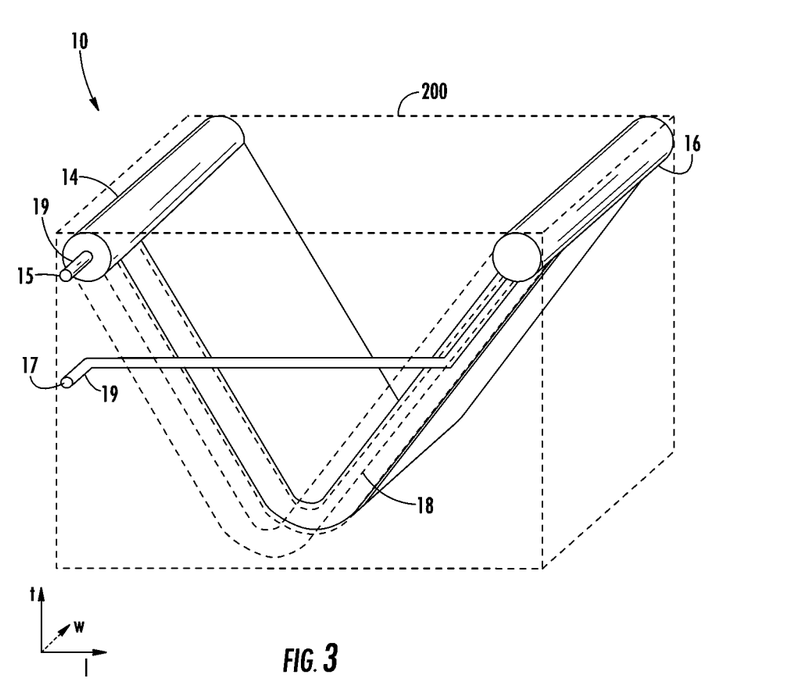
FIG. 3 is a schematic side view of a V-shaped microchannel heat exchanger.

An example of a V-shaped microchannel heat exchanger is shown in FIG. 3. An unoccupied region 18 (in dotted lines) is interrupted by fluid conduit 19 conveying fluid from the outlet header 16, along a side of the box-like volume 200, and to the outlet port 17.

Figure 4:
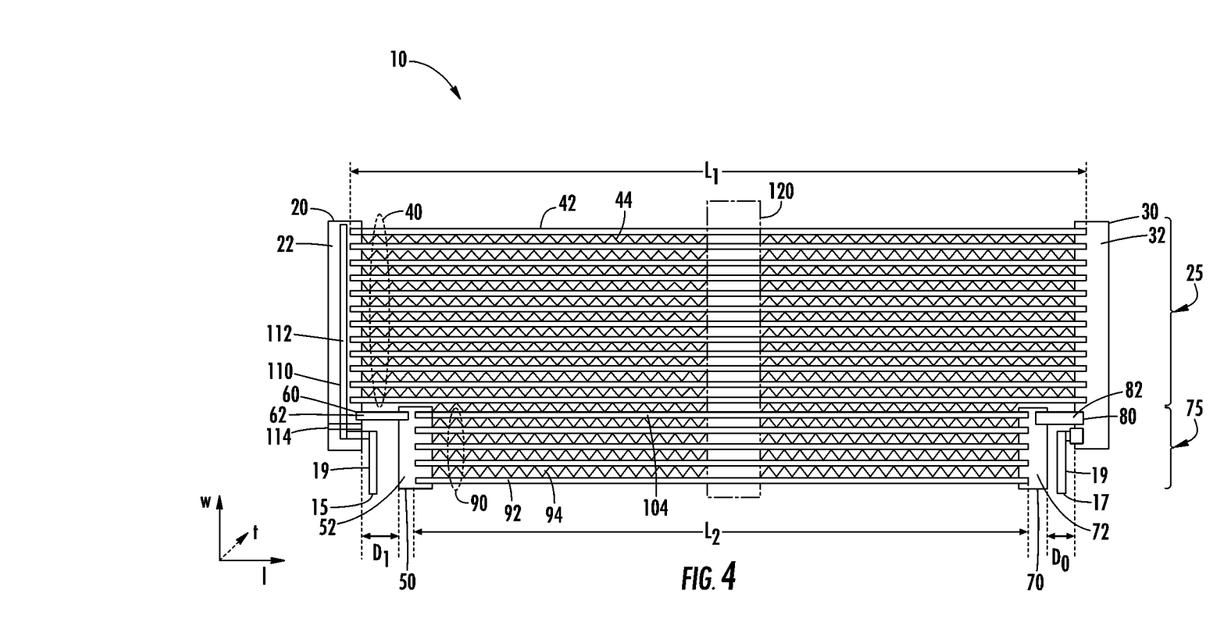
FIG. 4 is a schematic top view of an end of a microchannel heat exchanger having a primary core and an auxiliary core.
Figure 5:
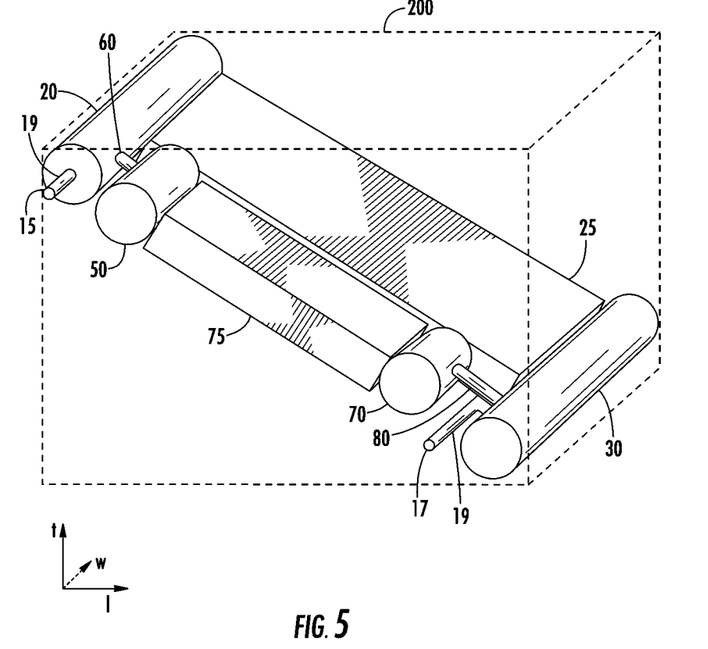
FIG. 5 is a schematic side view of a diagonal flat microchannel heat exchanger having a primary core and an auxiliary core.
Figure 6:
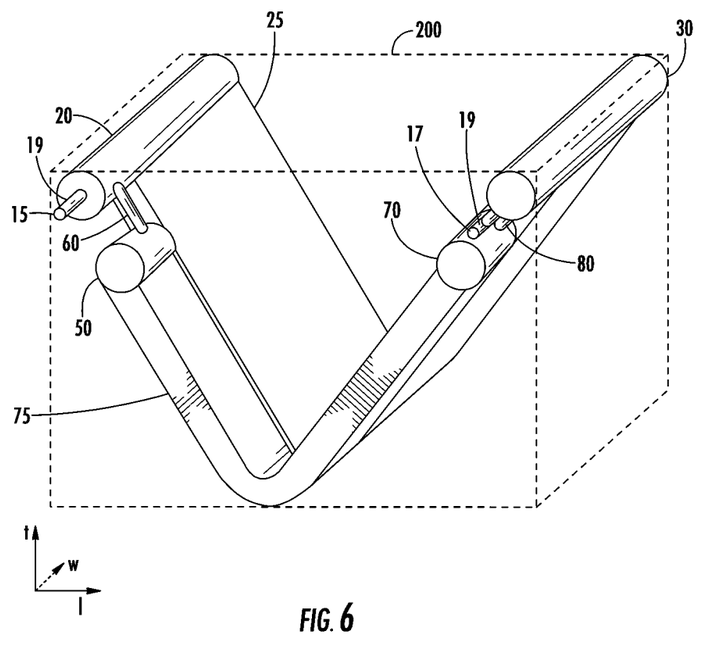
FIG. 6 is a schematic side view of a V-shaped microchannel heat exchanger having a primary core and an auxiliary core.

The microchannel heat exchanger 10 presented in FIGS. 4-6 can overcome limitations imposed by inlet and/or outlet plumbing by configuring a secondary core 75 that can occupy some of the previously unoccupied region 18. The microchannel heat exchanger 10 is pictured in a flat position in FIG. 4, without any bending or folding of the microchannel tubes, and is pictured extending within a box-shape volume 200 in FIG. 5 (positioned diagonal) and FIG. 6 (bent into a V-shape). The primary core 25 of the microchannel heat exchanger 10 includes a first header 20 having a first collection volume 22 disposed therein, and a second header 30 having a second collection volume 32 disposed therein. The primary core 25 includes a first plurality of microchannel tubes 40 having a first plurality of fluid passages 42 extending therethrough. The first plurality of microchannel tubes 40 have a primary tube length $L_1$ (along the l dimension in the attached figures) and extend between the first header 20 and the second header 30 such that the first plurality of fluid passages 42 are in fluid communication with the first collection volume 22 and the second collection volume 32. In this way, the first plurality of microchannel tubes 40 provide a plurality of fluid conduits, fluidly connecting the first header 20 and the second header 30. The first plurality of microchannel tubes 40 can be evenly spaced along an axial length (along the w dimension in the attached figures) of the inlet header 20 and outlet header 30.

The secondary core 75 of the microchannel heat exchanger 10 includes a first auxiliary header 50 having a first auxiliary collection volume 52 disposed therein and a second auxiliary header 70 having a second auxiliary collection volume 72 disposed therein. The secondary core 75 includes a second plurality of microchannel tubes 90 having a second plurality of fluid passages 92 extending therethrough. The second plurality of microchannel tubes 90 have a secondary tube length $L_2$ (along the l dimension in the attached figures) and extend between the first auxiliary header 50 and the second auxiliary header 70 such that the second plurality of fluid passages 92 are in fluid communication with the first auxiliary collection volume 52 and the second auxiliary collection volume 72.

In an embodiment the secondary tube length $L_2$ can be less that the primary tube length $L_1$ so as to allow the secondary core 75 to be positioned between the headers of the primary core 25. Thereby establishing an inlet offset distance $D_i$ between the first header 20 and the first auxiliary header 50 and outlet offset distance $D_o$ between the second auxiliary header 70 and the second header 30 can be described. The inlet offset distance $D_i$ can be different that the outlet offset distance $D_o$. For example, the outlet offset distance can be greater than the inlet offset distance, such as to allow for larger outlet plumbing (e.g., larger fluid conduit 19 and/or outlet port 17). Allowing for different size plumbing to and from the heat exchanger can help to handle larger volumetric flow through the outlet as can be useful when phase change occurs in the heat exchanger.

The first header 20 can include a fluid distributor 110 having a plurality of outlet ports 112. The outlet ports 112 can be configured to distribute the inlet first heat transfer fluid to the first plurality of microchannel tubes 40 and to the second plurality of microchannel tubes 90, by way of the first header interconnect 60, with a desired profile. The fluid distributor 110 can be inserted into the first header 20 and sealed around the distributor cap 114 (e.g., in a brazing, welding or similar process) to ensure a leak-proof operation. The fluid distributor 110 can help to achieve a desired flow profile throughout the microchannel tubes (e.g., having substantially equal flow rate through each passage of the first plurality of flow passages 42 and the second plurality of flow passages 92).

The primary core 25 can include a first plurality of heat transfer fins 44 disposed between adjacent tubes of the first plurality of microchannel tubes 40. The secondary core 75 can include heat transfer fins 94 disposed between adjacent tubes of the second plurality of microchannel tubes 90. The secondary core 75 can be disposed adjacent to the primary core 25, configured such that the two cores can optionally share a third plurality of fins 104. The third plurality of heat transfer fins 104 can be disposed between adjacent tubes of the first plurality of microchannel tubes 40 and the second plurality of microchannel tubes 90. A finless section 120 can extend across the primary core 25, the secondary core 75, and, if present, across shared fins 104 disposed therebetween. Such a section, free of fins, can allow for bending of the microchannel heat exchanger 10 into a bent configuration (e.g., V-shape, A-shape, W-shape, and the like as described previously), such as for installation into a final product. Fins of the microchannel heat exchanger 10 can include any suitable heat transfer fin type, including for example, lanced, louvered, slotted, offset, wavy, or a combination comprising at least one of the foregoing.

Fluidly connecting the secondary core 75 to the primary core 25 are a pair of interconnects disposed between corresponding headers. The first header interconnect 60 extends between the first header 20 and the first auxiliary header 50 and has a first interconnect fluid passage 62 extending therethrough for transporting fluid between the first header 20 and the first auxiliary header 50. The second header interconnect 80 extends between the second auxiliary header 70 and the second header 30 and has a second interconnect fluid passage 72 extending therethrough for transporting fluid between the second auxiliary header 70 and the second header 30.

Figure 7:
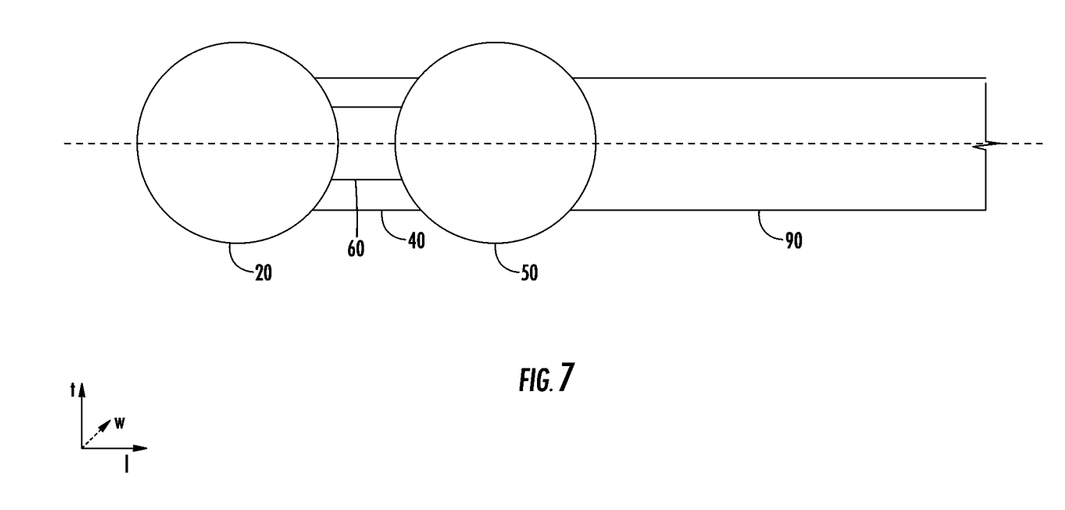
FIG. 7 is a schematic end view of a microchannel heat exchanger having a primary core and an auxiliary core.
Figure 8:
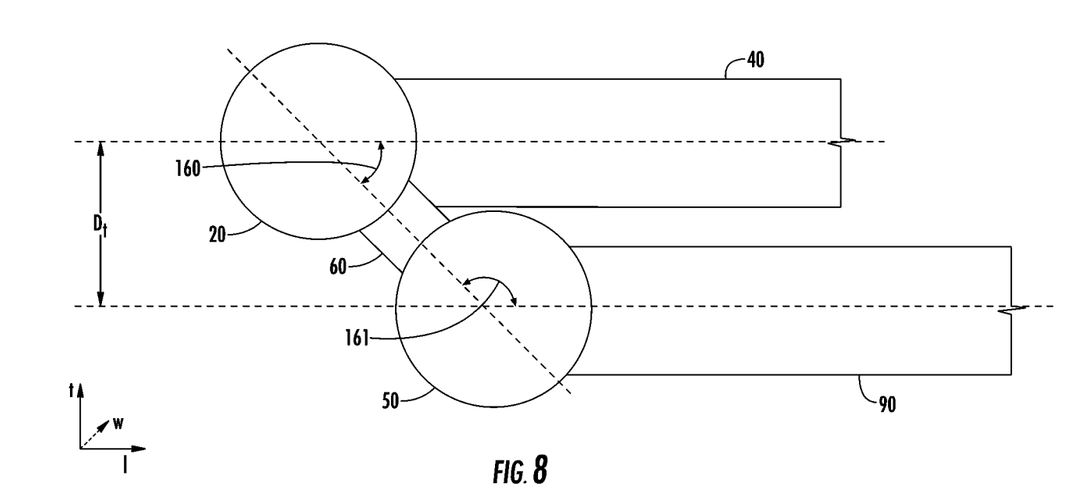
FIG. 8 is a schematic end view of a microchannel heat exchanger having a primary core and an offset auxiliary core.

The first header interconnect 60 and the second header interconnect 80 can each be attached to the corresponding header (20, 30) at any suitable location and having any suitable orientation. FIG. 7 shows a coplanar parallel orientation where an interconnect (60, 80) can be attached on the same side of a header (20, 30) that the first plurality or microchannel tubes 40 are attached and can extend substantially parallel (e.g., along the 1 dimension in) to the first plurality of microchannel tubes 40. FIG. 8 shows an angled orientation where an interconnect (60, 80) can be attached at an angle 160 relative to the first plurality of microchannel tubes 40. In this way the secondary core 75 can be spaced a distance $D_t$ (along the t dimension in the attached figures) from the primary core 25.

The first header interconnect 60 and the second header interconnect 80 can each be attached to the corresponding auxiliary header (50, 70) at any suitable location having any suitable orientation. FIG. 7 shows a coplanar orientation where an interconnect (60, 80) can be attached to the corresponding auxiliary header (50, 70) along a side opposite of the side to which the second plurality of microchannel tubes 90 are attached and the interconnect (60, 80) and the second plurality of microchannel tubes 90 can extend in the same plane (e.g., in the 1-w plane in FIG. 7). FIG. 8 shows an angled orientation where an interconnect (60, 80) can be attached at a first angle 160 relative to the plurality of microchannel tubes 40. In this way the secondary core 75 can be spaced a distance $D_t$ (along the t dimension in the attached figures) from the primary core 25. The second plurality of microchannel tubes 90 can extend parallel to the first plurality of microchannel tubes 40. For example, a second angle 161 can be a supplementary consecutive interior angle relative to the first angle 160 (such that they add to 180 degrees).

The first header interconnect 60 and the second header interconnect 80 can each be any suitable size and shape and can include any number of fluid conduits sufficient to transport fluid without causing an undesirable flow distribution through the microchannel heat exchanger 10 (e.g., unintended uneven flow rates through the first and/or second plurality of microchannel tubes). For example, an interconnect (60, 80) can include a single fluid passage or a plurality of fluid passages. In particular, an interconnect can include a single round tube having a single fluid passage therethrough, multiple round tubes each having single fluid passages therethrough, or one or more multi-port tubes having a plurality fluid passages therethrough, or a combination including at least one of the foregoing.

The first interconnect fluid passage 62 can have a first cross sectional flow area $F_1$ and the second interconnect fluid passage 82 can have a second cross sectional flow area $F_2$. The first plurality of fluid passages 42 can have a first total cross sectional flow area $F_{m1}$ (e.g. the summation of the cross sectional flow areas of all passages of the first plurality of fluid passages 42) and the second plurality of microchannel tubes can have a second cross sectional flow area $F_{m2}$ (e.g. the summation of the cross sectional flow areas of all passages of the first plurality of fluid passages 42). The first cross sectional flow area $F_1$ can be greater than, equal to, or less than the second cross sectional flow area $F_2$. In an example, the first cross sectional flow area $F_1$ can be sized for transporting a single phase liquid heat transfer fluid (vapor quality=0) and the second cross sectional flow area $F_2$ can be sized for a two-phase vapor/liquid or single-phase vapor heat transfer fluid (0<vapor quality≤1). In an embodiment, at least one of the first interconnect fluid passage 62 and second interconnect fluid passage 82, include one or more fluid passages having a total cross sectional flow area ($F_1$, $F_2$) equal to from about 80% to about 120%, or about 90% to about 110%, or about 95% to about 105%, of the second cross sectional flow area $F_{m2}$.

The secondary core 75 can have less total heat transfer surface area than the primary core 25, e.g. $L_2$ can be less than $L_1$ and other parameters (e.g., fin type, spacing, and the like) kept the same. The interconnects (60, 80) and secondary core 75 can be sized (e.g. flow area of the corresponding fluid passages) such that the pressure drop vs. flow characteristic closely resembles that of the primary core 25. For example, a cross sectional flow area of one or more of the first interconnect fluid passage 62, the first auxiliary collection volume 52, the secondary plurality of fluid passages 92, the second auxiliary collection volume 72, and the second interconnect fluid passage 80, can be configured such that for a given total flow condition through the microchannel heat exchanger 10, the flow rate per tube through the first plurality of fluid passages 42 is equal to from about 80% to about 120%, or about 90% to about 110%, or about 95% to about 105%, of to a flow rate per tube of the second plurality of fluid passages 92.

The headers (20, 30, 50, 70) can be any suitable size and shape. For example, the headers (20, 30, 50, 70) can have a cross-sectional shape including circular, oval, triangular, quadrilateral, D-shaped, half-circle, and the like. Furthermore, an auxiliary header (50, 70) can have the same cross-sectional shape as at least one of the first header 20 and the second header 30. For example, the first header 20, second header 30, first auxiliary header 50, and/or second auxiliary header 70 can have a circular cross-section having an inside diameter from about 12 millimeters (mm) to about 60 mm, or from about 20 mm to about 36 mm, or from about 26 mm to about 28 mm, or about 27 mm. Similarly, the first header 20, second header 30, first auxiliary header 50, and/or second auxiliary header 70 can have a D-shaped cross-section having an longest cross-sectional dimension from about 12 mm to about 60 mm, or from about 20 mm to about 36 mm, or from about 26 mm to about 28 mm, or about 27 mm.

Figure 9:
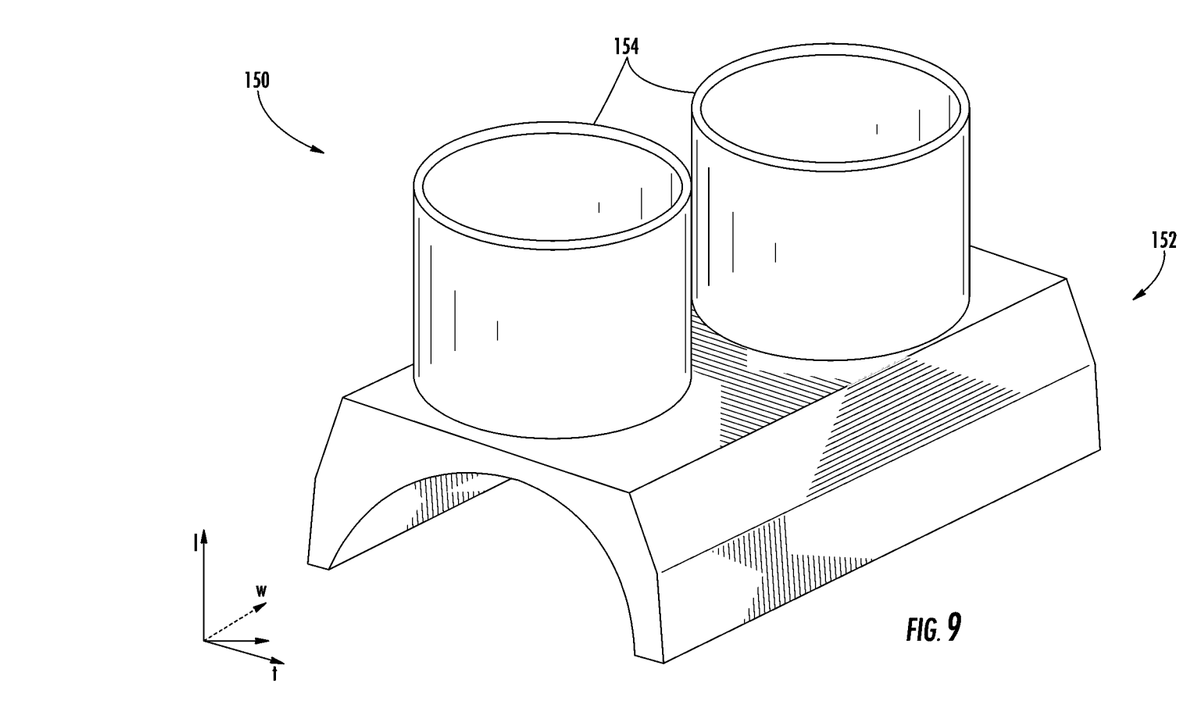
FIG. 9 is a schematic side view of a dual port block fitting.

Interconnects (60, 80) can be co-located with a fluid conduit 19 which can improve the compactness of the microchannel heat exchanger 10. For example, a dual port block fitting 150 as shown in FIG. 9, having a saddle portion 152 for attaching and covering an opening of a header (e.g., using a brazing, welding, or like bonding process) and a pair of extended stubs 154 for connecting to an interconnect (60, 80) and a fluid conduit 19. The fluid conduit 19 can extend from an extended stub 154 of the block fitting 150 to an inlet port 15 or an outlet port 17.

The microchannel heat exchanger 10 can be oriented such that a second heat transfer fluid (e.g., air, combustion exhaust such as from combustion of natural gas, propane, and the like) flows across the thickness dimension (the t dimension in the attached figures) of the microchannel tubes. For example, in FIG. 2 a second heat transfer fluid could flow through the microchannel heat exchanger 10 along the t dimension, either in the positive t direction or negative t direction. To guide the flow of the second heat transfer fluid through the primary core 25 and secondary core 75 one or more flow baffles can be used. The one or more flow baffles can include sheet material (e.g., plastic or metal sheet stock) configured to obstruct one or more open flow areas and redirect the second heat transfer fluid preferentially through the heat exchanger cores. A flow baffle can be cut, formed, and/or shaped into any suitable surface and can be attached to the microchannel heat exchanger 10 using any suitable fastening means (e.g., welding, brazing, tying, and the like).

For example, a flow baffle can close one or both open ends of a V-shaped microchannel coil 10 with a triangular shaped baffle (e.g., extending in a t-1 plane in the attached figures). A first flow baffle can be arranged adjacent the secondary core 75, on the side of the secondary core 75 opposite from the primary core 25, for preferentially directing flow away from the side (e.g., front side in FIG. 6) and toward the center of the box-shaped volume 200. A second flow baffle can be arranged adjacent a primary core 25, on a side of the primary core 25 opposite from the secondary core 75 (e.g., and adjacent a rear side of the box-shaped volume 200). A flow baffle can be used to block flow through volumes directly surrounding the interconnects (60, 80) and/or the auxiliary headers (50, 70) where there can be more open space in the box-shaped volume 200 for the second heat transfer fluid to bypass the primary core 25 and/or the secondary core 75.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A microchannel heat exchanger comprising:
    a primary core comprising:
        a first header having a first collection volume therein;
        a second header having a second collection volume therein;
        a first plurality of microchannel tubes having a first plurality of fluid passages extending therethrough and having a primary tube length $L_1$, wherein the first plurality of microchannel tubes extend between the first header and the second header such that the first plurality of fluid passages are in fluid communication with the first collection volume and the second collection volume; and
        a first plurality of fins disposed between adjacent tubes of the first plurality of microchannel tubes;
    a secondary core comprising:
        a first auxiliary header having a first auxiliary collection volume therein;
        a second auxiliary header having a second auxiliary collection volume therein;
        a second plurality of microchannel tubes having a second plurality of fluid passages extending therethrough and an auxiliary tube length $L2$, wherein the second plurality of microchannel tubes extend between the first auxiliary header and the second auxiliary header such that the second plurality of fluid passages are in fluid communication with the first auxiliary collection volume and second auxiliary collection volume; and
        a second plurality of fins disposed between adjacent tubes of the second plurality of microchannel tubes; and
    a first header interconnect extending between the first header and the first auxiliary header and having a first interconnect fluid passage extending therethrough; wherein the first interconnect fluid passage is in fluid communication with the first collection volume and the first auxiliary collection volume; and
    a second header interconnect extending between the second auxiliary header and the second header and having a second interconnect fluid passage extending therethrough; wherein the second interconnect fluid passage is in fluid communication with the second collection volume and the second auxiliary collection volume;
    wherein at least one of the first header interconnect fluid passage and the second header interconnect fluid passage comprise a cross sectional flow area F that is equal to from about 80% to about 120% of a total cross sectional flow area of the plurality of second microchannel tubes.

2. The microchannel heat exchanger of claim 1, further comprising a third plurality of fins and wherein the first plurality of microchannel tubes is disposed adjacent to the second plurality of microchannel tubes, and wherein the third plurality of fins is disposed between adjacent tubes of the first plurality of microchannel tubes and the second plurality of microchannel tubes.

3. The microchannel heat exchanger of claim 1, wherein the first auxiliary header extends substantially parallel to the first header and the second auxiliary header extends substantially parallel to the second header and the first and second auxiliary headers are disposed adjacent the first plurality of microchannel tubes.

4. The microchannel heat exchanger of claim 1, further comprising a fluid distributor disposed in the first collection volume of the first manifold, wherein the fluid distributor comprises a plurality of outlet ports.

5. The microchannel heat exchanger of claim 1, wherein the secondary tube length $L_2$ is less than the primary tube length $L_1$.

6. The microchannel heat exchanger of claim 1, wherein the first plurality of microchannel tubes comprises more tubes than the second plurality of microchannel tubes.

7. The microchannel heat exchanger of claim 1, wherein at least one of the first header interconnect and the second header interconnect consist of a single fluid passage therethrough.

8. The microchannel heat exchanger of claim 1, wherein at least one of the first header interconnect and the second header interconnect consist of a plurality of fluid passages therethrough.

9. The microchannel heat exchanger of claim 1, wherein at least one of the first header interconnect fluid passage and the second header interconnect fluid passage comprise a cross sectional flow area F that is equal to from about 90% to about 110% of a total cross sectional flow area of the plurality of second microchannel tubes.

10. The microchannel heat exchanger of claim 1, wherein at least one of the first header interconnect fluid passage and the second header interconnect fluid passage comprise a cross sectional flow area F that is equal to the total cross sectional flow area of the plurality of second microchannel tubes.

11. The microchannel heat exchanger of claim 1, wherein the secondary core is spaced a distance $D_t$ from the primary core and wherein the distance $D_t$ is measured along a flow direction of a second heat transfer fluid.

12. The microchannel heat exchanger of claim 1, further comprising a flow baffle disposed adjacent at least one of the primary core or the secondary core.

13. The microchannel heat exchanger of claim 1, wherein the microchannel heat exchanger is assembled using a brazing process.

\* \* \* \* \*